(12) United States Patent
Streifer (10) Patent No.: US 6,898,590 B1
(45) Date of Patent: May 24, 2005

(54) SCHOOL SYSTEM DATABASE (75) Inventor: Philip A. Streifer, Avon, CT (US)

(73) Assignee: EDsmart, Inc., New Britain, CT (US)

( * ) Notice: Subject to any disclaimer, the term of this patent is extended or adjusted under 35 U.S.C. 154(b) by 368 days.

(21) Appl. No.: 10/036,132

(22) Filed: Dec. 28, 2001

(51) Int. Cl.[7] .............................................. G06F 17/30
(52) U.S. Cl. .................... 707/2; 707/1; 707/6; 707/100
(58) Field of Search ............................... 707/1, 2, 6, 9, 707/10, 100, 201, 102, 104.1; 434/1, 323–327

(56) References Cited

U.S. PATENT DOCUMENTS

| | | | | |
|---|---|---|---|---|
| 5,369,761 A | * | 11/1994 | Conley et al. .................. | 707/2 |
| 5,615,367 A | * | 3/1997 | Bennett et al. ............. | 707/102 |
| 5,991,776 A | | 11/1999 | Bennett et al. ............. | 707/205 |
| 6,505,031 B1 | * | 1/2003 | Slider et al. ................ | 434/350 |
| 6,643,493 B2 | * | 11/2003 | Kilgore ....................... | 434/350 |
| 6,651,216 B1 | * | 11/2003 | Sullivan et al. ............. | 715/503 |
| 6,675,160 B2 | * | 1/2004 | Hara et al. ...................... | 707/3 |
| 6,685,482 B2 | * | 2/2004 | Hopp et al. ................. | 434/323 |
| 6,688,891 B1 | * | 2/2004 | Sanford ....................... | 434/365 |

* cited by examiner

Primary Examiner—Greta Robinson
Assistant Examiner—Cheryl Lewis
(74) Attorney, Agent, or Firm—McCormick, Paulding & Huber LLP (57) ABSTRACT A denormalized database has a master student table having records containing fields last name, first name and a unique identifier corresponding to each student, related data tables linked to the master student table have records containing a field having the unique identifier, and test results tables individually linking the master student table having test results for each student and a unique identifier. Related data tables may link through the linking table to the master student table via a concatenated identification code corresponding to each student identification code. A special student table containing historical data of all entries, a status data table/field having fields containing enrollment status and the unique identifier code. Primary no-duplication keys operate to indicate that a table having such a key will accept only unique new entries. Related data tables may be linked through an intermediate linking table having a field containing a concatenated identification code corresponding to each student identification code and linked to another related data table.

20 Claims, 4 Drawing Sheets

SCHOOL SYSTEM DATABASE

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates to data storage for school systems, and in particular, to denormalized database designs for school systems.

BACKGROUND OF THE INVENTION

In keeping with widely accepted notions of database design for data warehousing, prior practice in this field has been to use a database design based on a single pre-engineered, a priori data model that is applied to all school systems. Additionally, this fixed data model has invariably been normalized, again in accord with accepted design principles.

Source data in traditional database designs must be mapped to the data warehouse model. Typically, the source data is mapped to an intermediate database where the data is cleaned and checked. Once the intermediate data model is fully populated and the data cleaned, these data are migrated to a final target database. This process is labor-intensive and time-consuming process.

All data fields in traditional data models must be populated before the data warehouse is functional. Mapping of all the data must be completed before the data warehouse is 'turned on' and all critical data tables must be loaded to allow for linking across data tables. If certain types of source data have not been collected, or are not readily available, substantial delays and expense occurs in making the traditional data warehouses operational while missing data are collected, cleaned, and loaded.

U.S. Pat. No. 5,991,776 issued to Bennett et al. describes a database system with improved methods for storing free-form data objects of data records in which the system provides each field of a table with a unique ID ("field ID") for tracking the field and corresponding field IDs stored with the fields of design documents permitting the system to maintain a link between a design document and its table. Date/stamp fields may be provided in '776 to maintain relationships between associated fields. A separate index of the IDs is used, and mapping of data is required therein.

Normalizing the database requires the mapping of every field in each data table to eliminate redundant data fields. This adds more time and expense to the implementation of a functioning system. A normalized database is disclosed in U.S. Pat. No. 5,615,367 issued to Bennett et al. which further teaches a relational database having an automatic linking of data tables by comparing unique keys from one table to the index of another table. The disclosure therein requires each table to be linked through an index of another table instead of directly to that table.

To accommodate new data types or fields, the fixed data model must be engineered at significant cost, and all data must be reloaded. For example, if a school system begins to administer, and collect data on, a new type of standardized examination not contemplated in the original fixed data model, a costly, time-consuming redesign and reconstruction of the fixed data model and data warehouse will be required.

Periodic refreshing of the data warehouse with current-period data encounters the same problems as the initial mapping, cleaning, and loading of data into the fixed data model. This means that on-going upkeep of the data warehouse is required which is time-consuming and expensive. This fixed data model makes data warehousing too cumbersome and expensive to be of use in school systems.

None of the above inventions and patents, taken either singularly or in combination, is seen to describe the instant invention as claimed.

SUMMARY OF THE INVENTION

The present invention relates to a denormalized database. The denormalized database has a master student table which has records containing entry fields having last name, first name and a unique identifier corresponding to each student in a school system. Related data tables linked to the master student table are provided in which each record in the related data tables contains a field having the unique identifier corresponding to each student record in the master student table. Test results tables are provided which are individually linked to the master student table and contain test results for each student and a unique identifier. Related data tables may be linked through a linking table to the master student table via a concatenated identification code corresponding to each student identification code. Furthermore, related data tables may be linked through an intermediate linking table which has a field containing a concatenated identification code corresponding to each student identification code and is in turn linked to another related data table.

Optionally, a special student table may be provided which contains historical data of all entries into the database for every student for every year. A status data field, or a separate status data table, is provided with the special student table. The status data field/table has at least one field indicating enrollment status for each student for each year and a field containing the unique identifier code. Additionally, primary no-duplication keys which operate to indicate that a table having such a key will accept only unique new entries.

An advantage of the present invention is that the need to map all data to an intermediate database, then clean and load the data to a final database, is eliminated. Because no change to the foundational schema is required to accommodate new data types according to the present invention, new data types can be added at any time. External data systems such as special education, personnel, and finance systems, can be efficiently integrated into the data warehouse generated. Periodic data refresh requires loading the current-period data to existing tables or adding new tables, without re-mapping all data or re-engineering the data model.

Another advantage of the present invention is that preexisting school system data can be loaded regardless of the condition or degree of completeness of the data and data types. Thus, the data warehouse can be made operational and useful quickly, while school system personnel continue to add or refine additional data and data types.

Additional advantages of the database design of the present invention includes the accommodation of all student information systems. The client data can be loaded regardless of condition or degree of completeness allowing them to use the system and determine what data they should begin cleaning or adding. The present application permits the integration of other external data systems such as special education, personnel and finance systems. There are no software limits to the data that can be loaded. No change in foundational data model design is needed. The denormalized approach of the present invention cuts costs because no intermediate to final target database mapping is required. Front-end users allow for unlimited drill-down capacity. Integrated software allows for cluster and decision-tree data mining without any other migration/modification of data. Upon refresh, new data are simply loaded to existing tables or tables are added.

Further advantages of the present invention involves enhanced drill-down and data-mining capabilities. Drill-down capabilities are enhanced by the database structure of the present invention. Existing data warehouse systems provide limited query ability. OLAP data cubes are limited by the decision as to what data to include in the cube. The software, used to access the conventional database, limits other systems. By integrating an application such as Seagate Decisions' Crystal Reports 8.5 into the warehouse system software of the present system, a school-system data warehouse with virtually unlimited drill-down capability is provided.

Data-mining capabilities are also enhanced. Data mining applications are expensive 'add-ons' to traditional data warehousing systems. Moreover, migrating data from the data warehouse to the data mining application is costly. The present invention may be integrated with a data mining application, such as Sequel 2000, limiting additional costs for the software and data migration.

These and other objects and advantages of the present invention will become readily apparent upon further review of the following drawings and specification

BRIEF DESCRIPTION OF THE DRAWINGS

The novel features of the described embodiments are specifically set forth in the appended claims; however, embodiments relating to the database structure and system the present invention, may best be understood with reference to the following description and accompanying drawings.

Similar reference characters denote corresponding features consistently throughout the attached drawings.

DETAILED DESCRIPTION OF PREFERRED EMBODIMENTS

Figure 1:
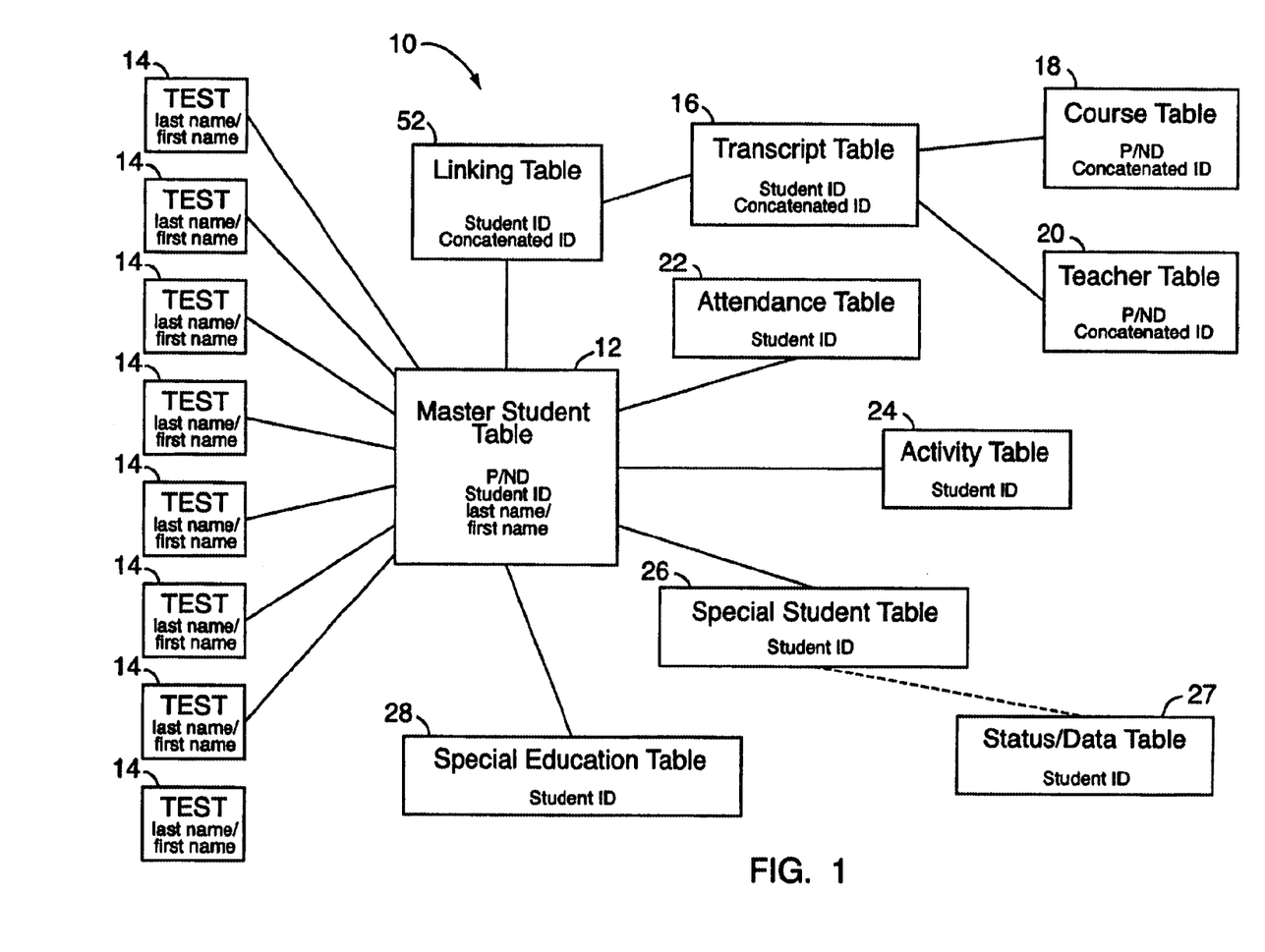
FIG. 1 is an object chart depicting a database design according to the present invention.
Figure 2A:
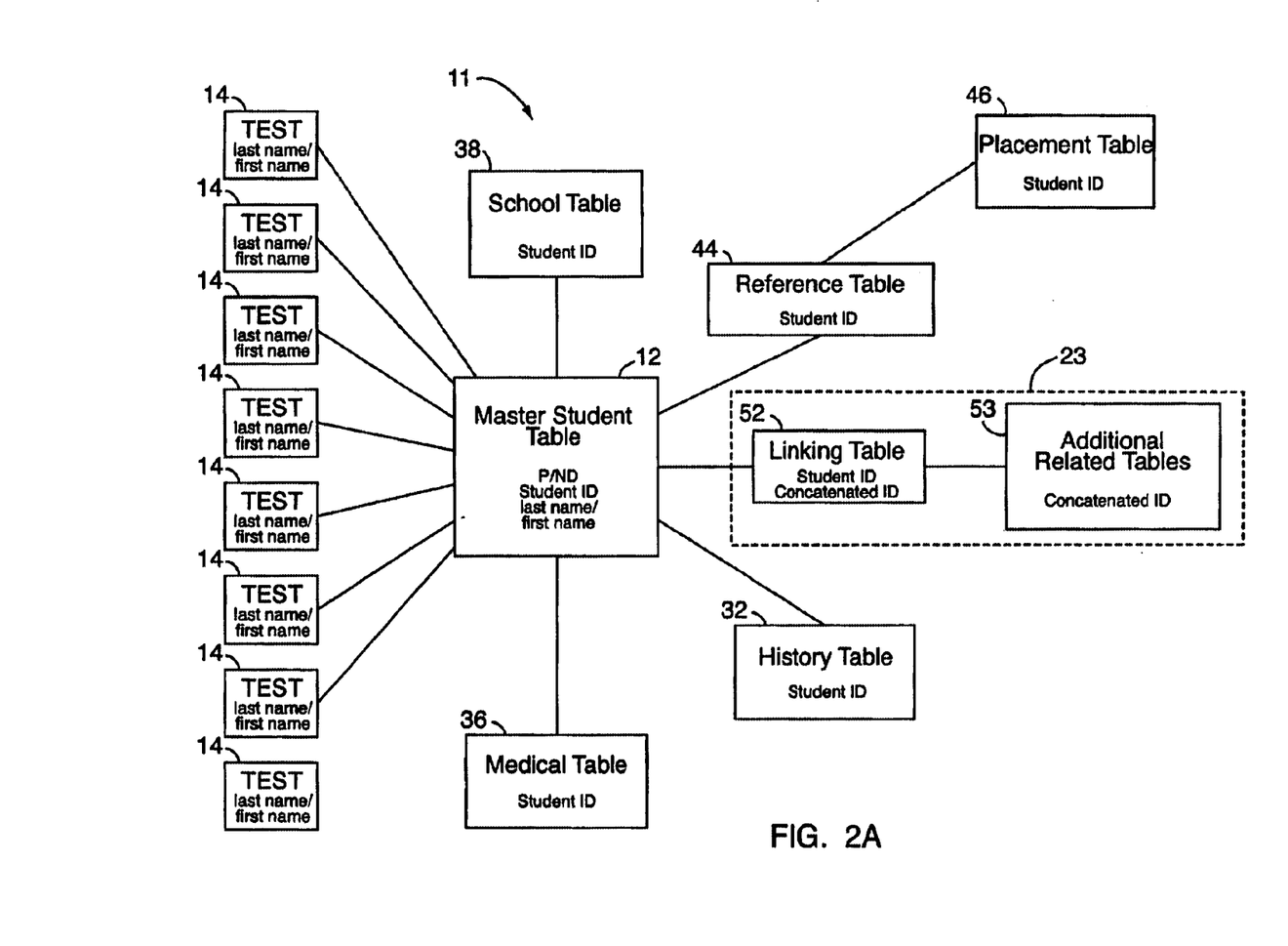
FIG. 2A is an object chart depicting another database design according to the present invention.

The database systems 10, 11, and 9 for storing student centric data shown in FIGS. 1, 2A/B, and 3 are each built around a fact table referred to as the master student table 12. All data is loaded directly from needed tables to form a denormalized database. In other words, the needed tables are not modified to match or correspond to the master student table 12. When a field is called which is empty or does not exist, a notation is made that the field is empty or does not exist. This permits all data to be loaded regardless of condition or degree of completeness allowing the use of the system 10 and determination at a later time about what data should be cleaned up or added. All table to table relationships are one-to-one or one-to-many. Furthermore, all data entries are preferably date stamped.

Off the shelf software may be used. Online analytical processing (OLAP) may also be used in the practice of the present invention. Decision support tools are available which are either natively supported or external client/middleware applications. External client/middleware applications may be used to facilitate both the data mining and data drilling of the present invention. Financial and school system related tables may be incorporated into the present invention to facilitate analysis of trends, etc. of such data as related to each student.

Each entry into a table of the present invention is referred to herein as a "record". Each record is further subdivided into "fields" in which each field is an element of a database record in which one piece of information is stored. The information stored may include short strings such as single words, numbers or alphanumeric codes; files such as text files, pictures, and graphics; links such as links to tables and other databases, computation strings, and the like. A record may comprise a single field. For example, the master student table 12 of the present invention contains a series of records, and each record relates to a single student. The student records contain separate fields which, at the least, contain the student's last name which may be called "Last_Name", first name "First_Name", and a unique identifier. In the master student table 12, the unique identifier is a student identification code, as discussed in greater detail hereinbelow. The term "unique identifier" also refers to a concatenated identification code where appropriate, as discussed further below.

Furthermore, the term "source system" as used herein refers to the user school system's own internal database. The term "downstream" refers to the virtual location of tables relative to the master student table 12. For example, in FIG. 1, the course table 18 is downstream from the transcript table 16.

The master student table 12 holds one record per each student, and is stored on a computer having a processor and a storage device. Preferably, the computer has Internet access allowing interaction, namely data inquiries, with the database over the World Wide Web. Each record in the master student table 12 corresponding to each student contains fields having at least the entries of last name, first name, and student identification code. The student identification code is a permanent source data assigned student identification code, typically a number referred to as "PERMNUM" or simply "ID" in the student identification code field. A date stamp field may also be provided with each entry or modification thereof. The date stamp field is added to a database to indicate the most recent date of refresh for internal data tracking purposes and may be referred to as "DATESTAMP". A middle name/initial field may be provided in the student record. Any unique entry, or combination of entries, may be used to maintain a relationship between tables.

Figure 2B:
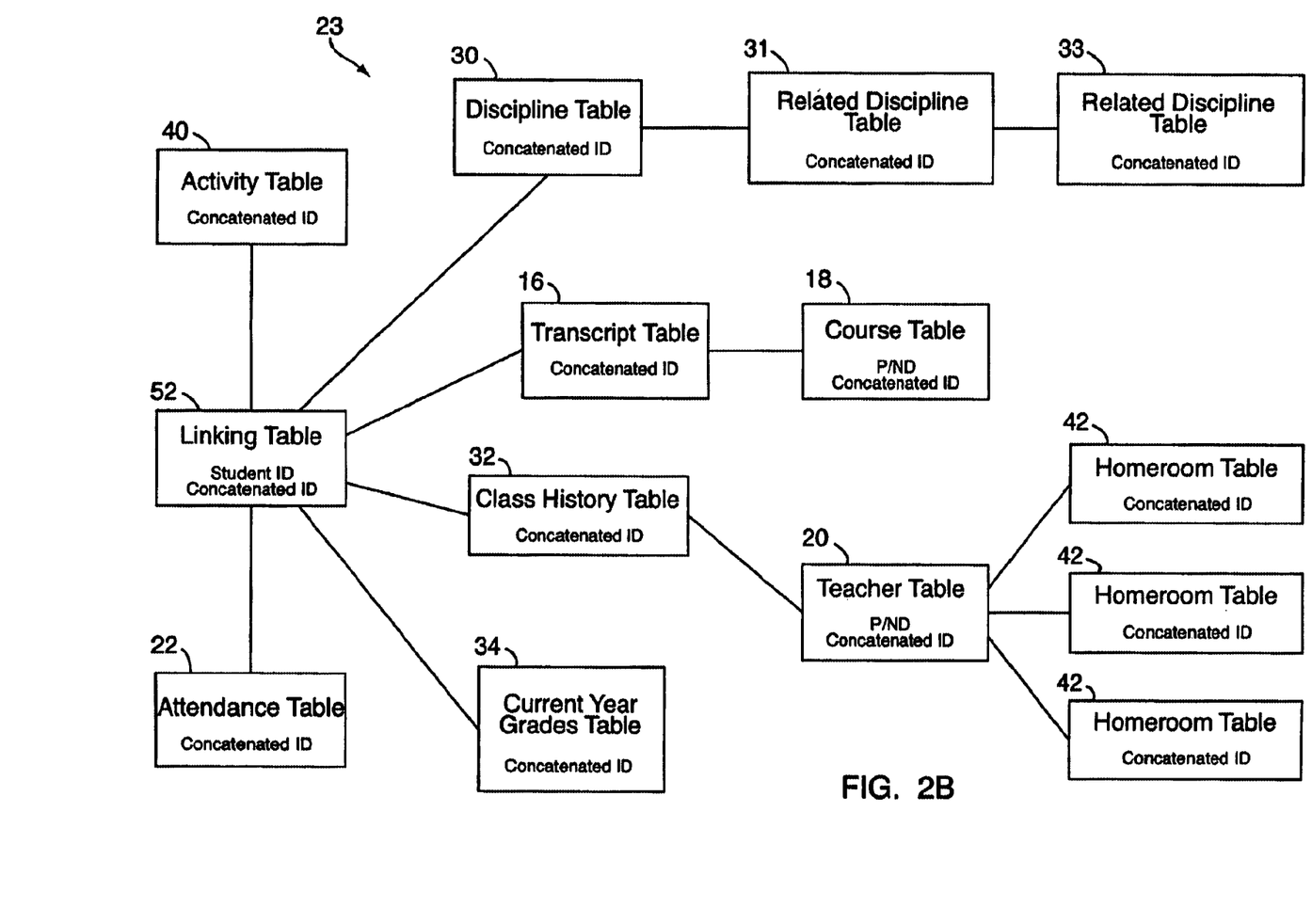
FIG. 2B is an expanded object chart depicting part of the database design of FIG. 2A.

One-to-one or one-to-many relationships exist between the master student table 12 and each of a plurality of related tables comprising a student information system. The related tables include but are not limited to test results tables 14, transcript tables 16, course tables 18, teacher tables 20, attendance tables 22, activity tables 24, special student tables 26, special education tables 28, discipline tables 30, class history tables 32, current year grades tables 34, medical tables 36, school tables 38, activity tables 40, home room tables 42, reference tables 44, placement tables 46, accounting tables 48, counselor tables 50 and the like. Any related table may also be linked to other tables. Furthermore, additional closely related tables such as the related discipline tables 31 and 33 may be linked to one another, as shown in FIG. 2B. Basically, any type of data tables typically used in school systems may be related tables permitting analysis and research to be performed on any school data based on the students in the school. For example, accounting information may be reviewed on a per student basis.

Figure 3:
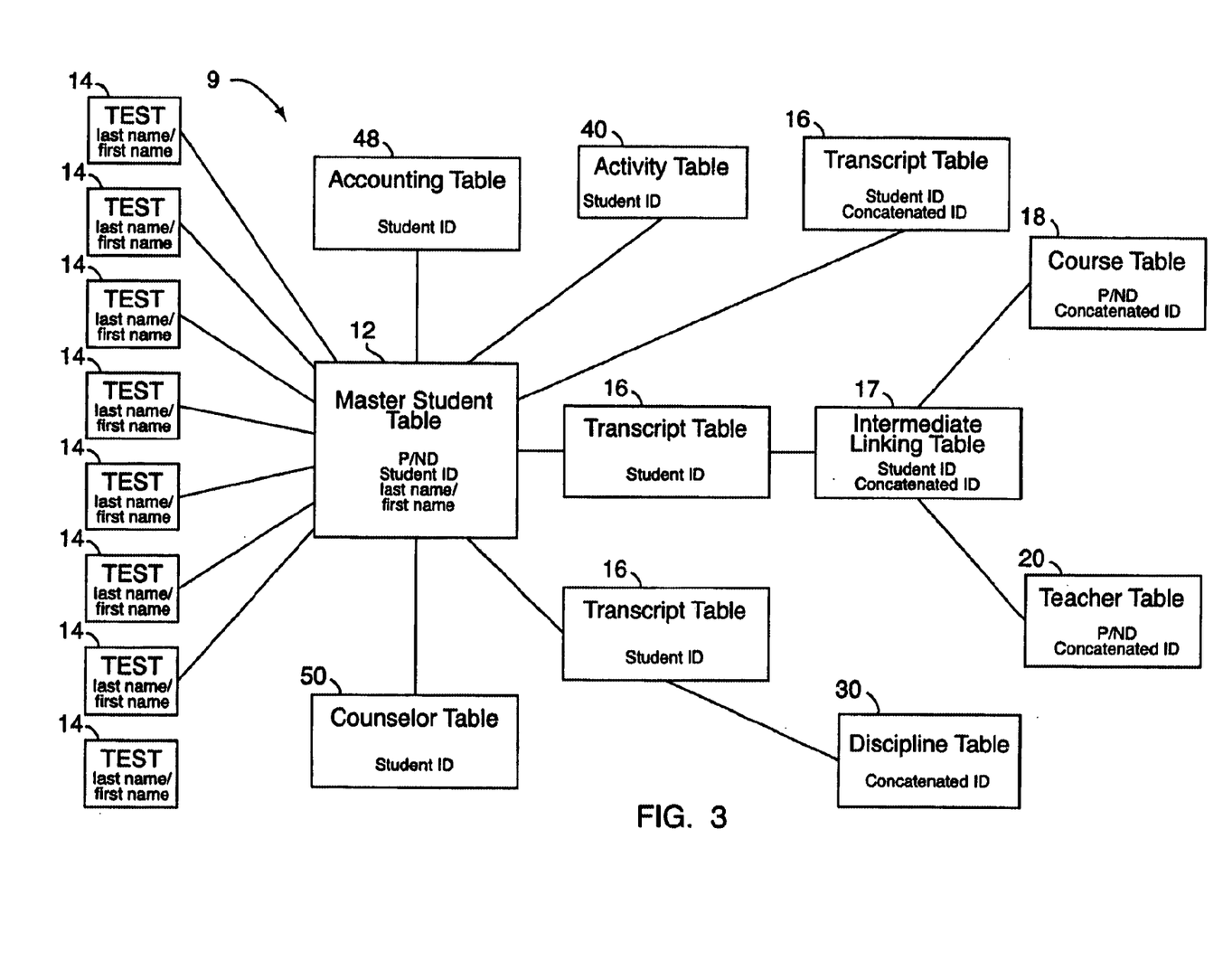
FIG. 3 is an object chart depicting yet another database design according to the present invention.

The master student table 12 may link directly to the related tables of the student information system directly via the student identification code, as shown in FIGS. 1, 2A and 3. Alternatively, the master student table 12 may be linked to the student information system via a linking table 52, as shown most clearly in FIGS. 1 and 2B. FIG. 2B is an expansion of the object chart depicted in FIG. 2A at numeral 23. Most systems are expected to require a linking table 52. A source table, typically the master student table 12, is sought and found which holds the student identification code, PERMNUM or ID. Once the source table is found, several fields which are used in that source table are used to link to other tables in the related tables downstream from the linking table 52. The fields are concatenated, that is arranged into a chained list, throughout all the needed tables. A one-to-one or one-to-many relationship between tables is assured throughout the database according to the present invention. The linking table 52 may be derived from attendance.

A concatenated identification code is generated in the linking table 52 for each of the student identification codes found in the master student table 12. This concatenated identification code is replicated in each of the concatenated fields in the related tables downstream of the linking table 52. The concatenated identification code assures that the data reported as related to a particular student maintains its identity.

The concatenated identification code may be called "SchStuSeq", and may be composed of a concatenation of the school number "Schoolnum" or "SCHOOL", student link code "Stulink", and a sequence code "Sequence" used for internal linking. The school number is an identification number corresponding to the school in which the student is currently enrolled. The student link code is an internal identification code assigned by the source system and assigned to a single student per academic year per school. Fields for both the student identification code from the master student table 12 and the concatenated identification code are found in each of the records in the linking table 52.

The link via the linking table 52 is shown in FIG. 2, where school number, sequence and student link are used to develop a concatenated identification code. Sequence and student link are special fields used by the source system (i.e., the school system's computer system) for internal linking. These special fields are used to engineer a link from the master student table 12 to related tables in the student identification system requiring such a link.

Standardized test results are entered into a plurality of test results tables 14 which are typically populated on a last name/first name basis but may also use student identification codes. Each test, or series of tests, are provided a separate test results table 14. The tests are kept as separate results tables 14 to allow for easy longitudinal querying. Student names not matched upon data entry are returned to the client. The school system is thereby provided the names of students whose test results have not been entered into the test results table 14 or whose names do not match with the names in the master student table 12.

Other descriptive tables, or lookup tables, are modified to have only one record per code. For example, an activity table 24 may be modified to hold only unique description codes. Course and teacher tables 18 and 20 hold only one record per course or teacher in each field. Other tables, such as the counselor and reference tables 50 and 44, may hold text files in each field. Yet other tables may hold a mixture of files or additional tables in each field. To facilitate user/school system ability to run queries on students over time, a special student table 26 which holds historical data of all entries for every student for every year is provided. If the 'status/date' field is present, it is included here or held in a separate table referred to as a 'status/date' table 27. The 'status/data' table 27 allows the district to query for the mobility of students.

Often links from transcript tables 16 to course and teacher tables 18 and 20 require further concatenation and intermediate tables 17. These intermediate tables 17 operate the same as the linking tables above but are not directly linked to the master student table. Instead of being linked to a master student table, the intermediate linking tables 17 are linked to another related table as shown in FIG. 3. Intermediate linking tables 17 may also be present wherever a linking function would be appropriate between two related tables instead of between the master student table 12 and a related table.

Related discipline tables 30 may need a concatenation possibly based on school number, student link, and incident code. The student link table 52 results from the source systems use of specific internal linking systems that rely on internal concatenations provided by the source systems' own computing processes. An example of an incident code is formed by merging the codes for school number, student link, and incident code to create a unique concatenated code. Similarly, the fields in the course table 18 may only be linkable to fields in the transcript table 16 via a concatenation based on a concatenated code derived from the school number and course number.

Integration of other systems, such as a special education database is accomplished through matches on student identification code or the concatenated code. In cases where student identification code does not match to the source data system, a linking table 52 may be repopulated with the student identification code from the master student table 12 to ensure that links can be made throughout the data warehouse.

All data added to existing tables are date stamped when added. New fields, should they exist, are appended to the table in a conventional manner. Uniquely new data are added as new tables with no change in the data model needed. Tables that have primary/no-duplicate keys (P/ND) accept only uniquely new entries. For tables that do not have P/ND, data are added on with a date stamp only. The date stamp comprises the load date and the school year date.

The embodiment of the present invention depicted in FIG. 1 incorporates both related tables linked directly to a master student table 12 and related tables linked to the master student table 12 through a linking table 52. The test results tables 14 are shown linked directly to the master student table 12 via the fields containing last and first names.

The related tables linked directly to the master student table 12 via the student identification code are an attendance table 22, an activity table 24, a special student table 26 and a special education table 28. The attendance table 22 typically has fields in each record for a student identification code, attendance status on a given day "STATUS" indicating whether the student is currently enrolled, attendance date "ATTENDDATE" and school number "SCHOOLNUM" or "SCHOOL". The activity table 24 typically has fields in each record for student activities, a date stamp, and a student identification code. The special education table 28 represents a variety of potential related data tables for students in school systems having special education databases, as discussed hereinafter. The special student table 26 depicted in FIG. 1 may have a status/data table 27 or corresponding status/data fields as discussed hereinabove.

In FIG. 1 only one table is linked directly to the linking table 52. A transcript table 16 is linked to the master student table 12 through the linking table 52. A course table 18 and a teacher table 20 are linked to the transcript table 16. The transcript table has records containing fields related to the student grades by class, a unique identifier (the concatenated identification code in this embodiment), a concatenation of school number and course identification code "SchCrs" may be used to link to the course table 18, a student link code, a year of data code "YEAR", the student identification code, the school number code, and a field for the year of the classes "CLASS_YR".

The course table 18 has records containing fields related to course information, a date stamp, a concatenation of school number and course identification code may be used to link to the transcript table 18, a school number, the unique identifier (the concatenated identification code), year of data "YEAR", and a field "CourseSchool" indicating the school where the course is taught. The teacher table 20 has records containing fields related to teacher demographics information, a date stamp field, teacher identification codes "TCHNUM" (which is uncleaned) and a second teacher identification code "TCHNUM2" or a teacher identification code "TeacherNumber" (which changes each year), teacher year "TeacherYear" (a concatenation used for linking purposes), year of data "YEAR", and the teacher's school "TeacherSchool".

The embodiment depicted in FIGS. 2A and 2B also incorporates both related tables linked directly to the master student table 12 as shown in FIG. 2A and to the master student table 12 through a linking table 52 shown in FIG. 2B. A plurality of test results tables 14 are linked directly to the master student table 12 as in the previous embodiment. The related tables linked directly to the master student table 12 include a school table 38, a reference table 44, a history table 32, and a medical table 36.

The school table 38 has records containing fields to facilitate mapping school codes (in the school number code) to full English descriptions, address information, and the like. The fields in the school table 38 include the school number code, a school abbreviated name "SCHOOLABRV", the school's full name "NAME", and a unique identifier (the student identification code). The reference table 44 is linked to a placement table 46. The reference table 44 has records containing fields for reference purposes and includes a unique identifier which is a student identification code. The placement table 46 has records containing fields for student placement purposes and includes the unique identifier the student identification code. The medical table 36 has records containing fields for medical data pertaining to the students and includes a field for the unique identifier the student identification code. The history table 32 has records containing fields comparable to the special student table 26 and maintains information on historical data and status/date information.

FIG. 2B depicts the linking table 52 and the additional related tables 53 linked therethrough which is indicated by the numeral 23 in FIG. 2A. All of the additional related tables in FIG. 2B has records containing fields wherein the unique identifier is the concatenated identification code, as discussed hereinabove. The related tables linked to the linking table 52, in this embodiment, include an activity table 40, a discipline table 30 which is in turn linked to a first related discipline table 31 that is also linked to a second related discipline table 33, a transcript table 16 which is linked to a course table 18, a class history table 32 which is linked to a teacher table 20 that is further linked to a plurality of homeroom tables 42, a current year grades table 34, and an attendance table 22.

The activity table 40 is the same as in the embodiment of FIG. 1 except that the unique identifier is the concatenated identification code. The transcript table 16 and the course table 18 are the same as in the embodiment of FIG. 1. The class history table 32 has records containing fields related to the student's history of past classes and includes fields for the date that the class started "STARTDATE", the date that the class ended "ENDDATE", and a unique identifier which is the student identification code. The teacher table 20 is the same as in the embodiment of FIG. 1. The plurality of homeroom tables 42 include records containing fields pertaining to each teacher's homeroom data plus the concatenated identification code.

An elementary homeroom teacher table having records containing fields designed to determine a student's elementary homeroom which includes fields for the second teacher identification code "TCHNUM2", unique identifiers (such as students' last names "Last_Name" and the concatenated identification code), and school identity code may be provided here. The teacher identification code used in this table may be generated for linking purposes possibly by cleaning from an original teacher identification code.

The current year grades table 34 is similar to the transcript table 16 and is used specifically for mapping to students' current grades, and has records containing fields with current grades "GRADE" for each student, a year of data for grades "YEAR", a school number code (as discussed hereinabove), and a unique identifier which is the concatenated identification code in this embodiment. The attendance table 22 is the same as discussed above with the embodiment of FIG. 1 except that the unique identifier is a concatenate identification code.

The discipline table 30 contains student disciplinary information such as punishments, suspensions and the like and has records with fields containing a description code "DESCCODE" used for linking, a discipline code "DISPCODE", a school number code, a student linking code, a comments "COMMENT" field for added discipline comments often used for a description of a discipline incident, a field for the staff member who referred student for disciplinary action "ReferredBy", an infraction code "InfractionCode" which contains an identification for infraction description used for linking purposes, an incident identification code "Ides", a penalty description code "PenaltyID" also used for linking, and a unique identifier the concatenated identification code.

The first and second related discipline table 31 and 33 are representative of possible additional tables containing information pertaining to particular fields of the discipline table 30 or additional data. The first related discipline table 31 may be a discipline disposition table which contains records having fields with student disciplinary information for linking, a unique identifier the concatenated code, a concatenation generated for linking to the main discipline table 30

"SchStuIncident", and a discipline code. The second related discipline table 33 may be a discipline description table having records containing fields having full-English lookup information regarding discipline codes to aid mapping to discipline code descriptions.

The embodiment of the present invention depicted in FIG. 3 demonstrates the use of an intermediate linking table 17. The master student table has a plurality of test results tables 14, as discussed above, linked directly thereto, an activity table 40 as discussed above with regard to the embodiment depicted in FIG. 1, an accounting table 48, and a counselor table 50. Three transcript tables are also found in FIG. 3, which are identical to one another except that one is linked to the intermediate linking table 17 which is linked in turn to the course table 20 and the teacher table 18, and another one is linked directly to a discipline table 30.

The course table 20, the teacher table 18, the discipline table 30, the transcript table 16, and the activity table 40 are discussed in further detail hereinabove except only with respect to their linking and unique identifier code. The counselor table 50 is a full-English lookup table for the counselor identification code and contains records having fields with a concatenation called school counselor "SchoolCounselor" and the unique identifier the student identification code. The accounting table 48, also known as accountability table, is used for tracking student obligations such as overdue library books, and has records containing fields for year of data "YEAR", the unique identifier the student identification code, a field indicating if record is active "IsActive", a data entry stamp for the user who created the entry "EnteredBy", and the date that the payment is due "ObliligationDate".

A year of grade table may be provided having records containing fields with demographics about multiple student identification codes per year, a unique identifier, student names, year of graduation, students' grade for that year, and students' school for that year. Furthermore, a course teacher table may be provided having records containing fields with multiple entries on student mapping to teacher and courses for scheduling, a concatenation used for linking to the teacher table "TeacherYear", a concatenation used for linking to courses table "CrsNumYr", and year of data "YEAR".

The database tables found in special education databases are specialized to each school system. Tables which may be incorporated into the special education database follows. A special education history table may be provided having records containing fields with historical data, a unique identifier such as "PERMNUM", and "LastName"; a special education location table having records containing fields with the location of student special education accommodations, a location identification code "EDLOC_CODE" (which may be used for linking as a unique identifier), and a location description "DESCRIPT".

A program location/hours table may be provided having records containing fields with the room location and time of accommodation, a district number identification code "DIST_NO", and an early education linking identification code "AGE_3_5_CODE". Also, a district demographics table may be provided having records containing fields with district demographic information, a district number identification code, and a district description (such as the name of the district); an early childhood table (a lookup table for the early education linking identification code) having records containing fields with early childhood information, the early education linking identification code, and a description of the code identity "DESCRIP".

A foster home lookup table may also be provided having records containing fields with entries pertaining to foster homes including a foster home identity code "DCF CODE" and a description designation "DESCRIP" indicating whether the foster home is in or out of the school system's district; an outplacement facilities table having records containing fields with entries pertaining to outplacement facilities including a placement agency identification code "PAC_AGEN2" and education facility identification code "EDFACCODE". A facility name lookup table may have records containing fields with entries pertaining to facility names and a field containing the education facility identification code. A gifted status table has records containing fields for gifted and/or talented student information, a gifted and/or talented lookup identification code "GIFTALENE_CODE", and a gifted and/or talented description "DESCRIPT".

A referrals time date table may be present having records containing fields with entries pertaining to student date and time referral information, referral notice received date "NOTICE_REC" and referral notice sent date "NOTICE_SNT"; a referral status table having records containing fields with entries pertaining to referrals including a referrals status identification code "STATUS" and a status description "DESCRIPT"; a placement table having records containing fields with entries pertaining to placement including placement status identification code "STATUS"; and a disabilities table having records containing fields including disability identification codes "DISBLT_NO2" and disability description "DESCRIPT".

It is to be understood that the present invention is not limited to the embodiments described above, but encompasses any and all embodiments within the scope of the following claims.

What is claimed is:

1. A denormalized database for storing student centric data on a computer having a processor and a storage device, the database comprising:

a plurality of tables stored on the storage device;

each table having a plurality of records containing at least one entry field for storing data, the plurality of tables includes a master student table which contains records corresponding to each of a plurality of students wherein each student record contains entry fields having last name, first name and at least one unique identifier corresponding to each student; and a plurality of related data tables linked to the master student table wherein each record therein contains a field having the unique identifier corresponding to each student record in the master student table.

2. The database of claim 1, further comprising:

a plurality of test results tables wherein each test results table represents a single standardized test event; and each test results table has a plurality of records for each standardized test result therein containing fields having test results and a field having the unique identifier;

wherein each test results table is individually linked to the master student table.

3. The database of claim 2, further comprising:

a linking table wherein at least one of the related data tables are linked through the linking table which in turn is linked to the master student table;

the unique identifier is a student identification code; and the linking table has a record with data fields corresponding to each student, and each record has fields containing the student identification code and a concatenated identification code corresponding to each student identification code; wherein each of the at least one related data tables is linked through the linking table and each record therein has a field containing a corresponding concatenated identification code.

4. The database of claim 3, further comprising:

means for reciprocal access to a global communications network.

5. The database of claim 3, further comprising:

a special student table having records for every student which contains a field for the unique identifier code and a field containing historical data of all entries into the database for every student for every year.

6. The database of claim 5, further comprising:

a status data table having at least one field indicating enrollment status for each year and a field containing the unique identifier code.

7. The database of claim 5, further comprising:

a status data field for each record indicating enrollment status for each year.

8. The database of claim 3, wherein at least one of the plurality of related tables includes:

a field having a primary no-duplication key which key operates to indicate that the table having a primary no-duplication key will accept only unique new entries.

9. The database of claim 3, wherein the master student table includes:

a field having a primary no-duplication key which key operates to indicate that the table having a primary no-duplication key will accept only unique new entries.

10. The database of claim 3, further comprising:

the unique identifier is a student identification code;

an intermediate linking table wherein at least one of the related data tables is linked through the intermediate linking table which in turn is linked to another related data table;

the intermediate linking table has a record with data fields corresponding to each student;

each record has a field containing the student identification code and a field containing a concatenated identification code corresponding to each student identification code, and each of the at least one related data tables linked through the linking table has a corresponding concatenated identification code.

11. The database of claim 10, wherein at least one of the plurality of related tables includes:

a field having a primary no-duplication key which key operates to indicate that the table having a primary no-duplication key will accept only unique new entries.

12. The database of claim 10, further comprising:

means for reciprocal access to a global communications network.

13. The database of claim 1, further comprising:

a linking table wherein at least one of the related data tables are linked through the linking table which in turn is linked to the master student table;

the unique identifier is a student identification code; and the linking table has a record with data fields corresponding to each student, and each record has fields containing the student identification code and a concatenated identification code corresponding to each student identification code; wherein each of the at least one related data tables is linked through the linking table and each record therein has a field containing a corresponding concatenated identification code.

14. The database of claim 1, further comprising:

a special student table having records for every student which contains a field for the unique identifier code and a field containing historical data of all entries into the database for every student for every year.

15. The database of claim 14, further comprising:

a status data table having at least one field indicating enrollment status for each year and a field containing the unique identifier code.

16. The database of claim 14, further comprising:

a status data field for each record indicating enrollment status for each year.

17. The database of claim 16, wherein at least one of the plurality of related tables includes:

a field having a primary no-duplication key which key operates to indicate that the table having a primary no-duplication key will accept only unique new entries.

18. The database of claim 1, wherein the master student table includes:

a field having a primary no-duplication key which key operates to indicate that the table having a primary no-duplication key will accept only unique new entries.

19. The database of claim 1, further comprising:

the unique identifier is a student identification code;

an intermediate linking table wherein at least one of the related data tables is linked through the intermediate linking table which in turn is linked to another related data table;

the intermediate linking table has a record with data fields corresponding to each student;

each record has a field containing the student identification code and a field containing a concatenated identification code corresponding to each student identification code, and each of the at least one related data tables linked through the linking table has a corresponding concatenated identification code.

20. A denormalized database for storing student centric data on a computer having a processor and a storage device, the database comprising:

a plurality of tables stored on the storage device;

each table having a plurality of records containing at least one entry field for storing data, the plurality of tables includes a master student table which contains records corresponding to each of a plurality of students wherein each student record contains entry fields having last name, first name and at least one unique identifier corresponding to each student; and the plurality of tables further includes a plurality of denormalized, related data tables linked to the master student table, wherein each and every one of the plurality of related data tables linked to the master student table contains a field having the unique identifier corresponding to each student record in the master student table or a concatenated identifier related to the unique identifier corresponding to each student record in the master student table.

* * * * *